(12) United States Patent
Watanabe

(10) Patent No.: US 6,462,516 B1
(45) Date of Patent: Oct. 8, 2002

(54) VOLTAGE CONTROLLER FOR AUTOMOTIVE ALTERNATOR

(75) Inventor: Hirohumi Watanabe, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 2 days.

(21) Appl. No.: 09/839,174

(22) Filed: Apr. 23, 2001

(30) Foreign Application Priority Data

Oct. 18, 2000 (JP) ........................................ 2000-317978

(51) Int. Cl.$^7$ ................................................. H02P 9/14
(52) U.S. Cl. ................................................. 322/28; 322/27
(58) Field of Search ............................. 322/25, 26, 27, 322/28, 29

(56) References Cited

U.S. PATENT DOCUMENTS

| | | | | |
|---|---|---|---|---|
| 4,555,657 A | * | 11/1985 | Kato et al. .................... | 320/123 |
| 5,703,472 A | * | 12/1997 | Aoyama et al. ................ | 322/28 |
| 5,719,485 A | * | 2/1998 | Asada ........................... | 322/24 |
| 5,973,482 A | * | 10/1999 | Meinert ......................... | 322/60 |
| 5,982,154 A | * | 11/1999 | Kanazawa et al. ............. | 322/28 |

FOREIGN PATENT DOCUMENTS

JP      8-19867      2/1996      ............ F02D/33/00

OTHER PUBLICATIONS

Abstract 8–19867, Feb. 28, 1996.

* cited by examiner

Primary Examiner—Nicholas Ponomarenko
(74) Attorney, Agent, or Firm—Sughrue Mion, PLLC

(57) ABSTRACT

A voltage controller for an automotive alternator prevents a delay in response to an engine controller, thus enabling proper engine control to be accomplished. The voltage controller for an automotive alternator includes a switching means connected to an alternator, which is driven by an engine to charge a battery, so as to control supply and cutoff of exciting current supplied to a field coil of the alternator, and a conduction rate monitoring output terminal for monitoring the conduction rate of the field coil. The conduction rate monitoring output terminal outputs the conduction rate of the field coil in a steady mode wherein the output voltage of the alternator is a predetermined voltage or more, while it outputs an alternator voltage change signal in a transient mode wherein the output voltage of the alternator is below the predetermined voltage.

15 Claims, 11 Drawing Sheets

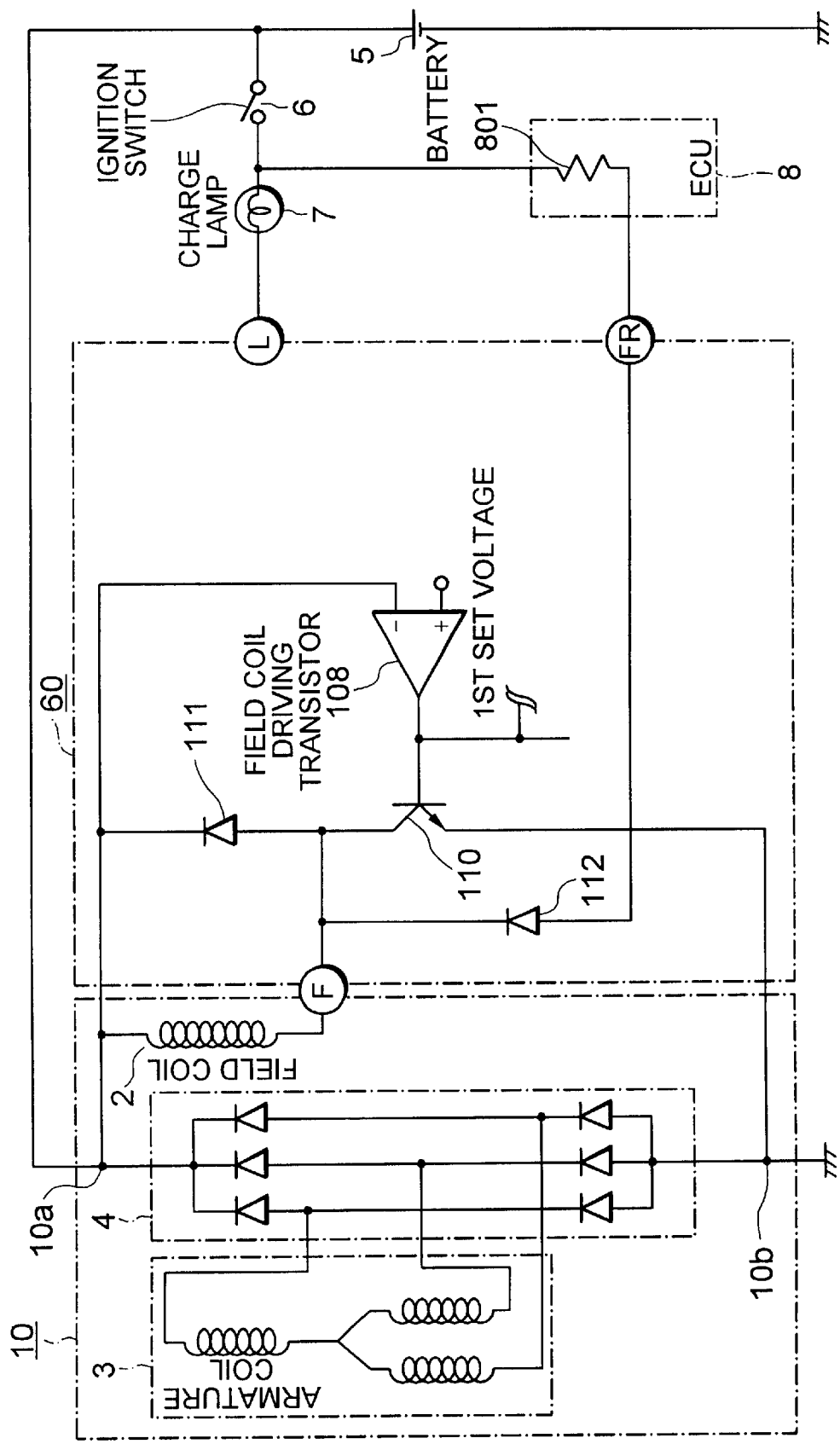

VOLTAGE CONTROLLER FOR AUTOMOTIVE ALTERNATOR

BACKGROUND OF THE INVENTION

1. Field of the Invention

The present invention relates to a voltage controller for an automotive alternator mounted on a vehicle and, more particularly, to a voltage controller for an automotive alternator having a switching means for controlling the supply and cutoff of exciting current supplied to a field coil of an alternator.

2. Description of the Related Art

FIG. 11 is a circuit diagram of a conventional voltage controller for an automotive alternator. Referring to FIG. 11, an automotive alternator 10 has a field coil 2, a Y-connected armature coil 3, and a rectifier 4. A main output terminal 10a of the alternator 10 is connected to the positive electrode of a battery 5, the negative electrode of the battery 5,being grounded.

A voltage: controller 60 is connected between the main output terminal 10a and a grounding terminal 10b of the alternator 10 The voltage controller 60 has an input terminal L to which the voltage of the battery 5 is applied via an ignition switch 6 and a charge lamp 7, which are interconnected in series. The voltage controller 60 has an FR terminal for monitoring the conduction rate of the field coil 2 of the alternator 10 from the ignition switch 6 via an external control unit 8.

When the ignition switch 6 is closed, the voltage from the battery 5 is applied to the L terminal via the charge lamp 7, and the voltage is applied to the FR terminal via a resistor 801 of the external control unit 8.

A comparator 108 serving as a switching means indicates a High state when a rectified output voltage from the rectifier 4, which is an AC output generated at the armature coil 3, is below a first set voltage, e.g., 14.5 v, and turns ON a field coil driving transistor 110 thereby to supply field current to the field coil 2. At this time, the current passes: via a diode 112, and the FR terminal indicates a Low state.

When the field current is supplied to the field coil 2, causing the alternator 10 to start generating power, and the output voltage of the alternator exceeds the aforesaid first set voltage, the output of the comparator 108 indicates the Low state. This causes the field coil driving transistor 110 to turn OFF, and the field current attenuates while circulating the field coil 2 and a diode 111. At this time, the FR terminal indicates the High state. Thus, the FR terminal monitors the conduction rate of the field coil 2 of the alternator 10.

The voltage controller 60 of the automotive alternator having the configuration described above includes the comparator 108 in which the first set voltage is set, and which serves as the switching means for controlling the supply and cutoff of the exciting current supplied to the field coil 2 of the alternator 10, and the FR terminal for monitoring the field coil conduction rate of the field coil 2 of the alternator 10. The output of the FR terminal is applied to the external control unit 8 so as to be used primarily for controlling the volume of intake air and the number of revolutions of an engine.

In general, when an electric equipment load, such as a head light or an electric radiator fan, consumes a large amount of electric power, the load on the alternator 10 suddenly increases. The increased load on the alternator 10 causes an increase in load on the engine, leading to a drop in engine speed. Consequently, at a low engine speed, as in the case of idling, for example, there has been a danger in that the engine undesirably stops.

To solve such a problem, there has conventionally been proposed, for example, incremental control of the alternator 10. According to the incremental control, even when the load on the alternator 10 suddenly increases, the operation of the alternator is not suddenly accelerated. Instead, the operation of the alternator is gradually accelerated in order to prevent the engine from stopping.

To be more specific, according to the incremental control, the field current supplied to the field coil 2 is gradually increased so as to avoid sudden acceleration of the operation of the alternator 10. However, carrying out the incremental control inevitably involves gradual increase in the number of monitor signals output to the FR terminal. This causes a delay in various types of control in the engine. For instance, a delay takes place in the control for increasing engine speed in response to an increase in the load on the alternator 10, leading to constant delay in response. This has been posing a problem in that the engine speed may gradually drop until the engine eventually stops.

SUMMARY OF THE INVENTION

Accordingly, the present invention has been made with a view toward solving the problem described above, and it is an object of the present invention to provide a voltage controller for an automotive alternator that is capable of avoiding a delay in response to an engine controller, thereby permitting proper engine control to be achieved.

To this end, the present invention provides a voltage controller for an automotive alternator, that includes a switching means connected to an alternator, which is driven by an engine to charge a battery, controls supply and cutoff of exciting current supplied to a field coil of the alternator and a conduction rate monitoring output terminal for monitoring the conduction rate of the field coil, wherein the conduction rate monitoring output terminal outputs the conduction rate of the field coil in a steady mode wherein the output voltage of the alternator is a predetermined voltage or more, while it outputs an alternator voltage change signal in a transient mode wherein the output voltage of the alternator is below the predetermined voltage.

Preferably, in the voltage controller for an automotive alternator, the conduction rate of the field coil is the conduction rate of a field coil driving transistor or an equivalent thereto, and the frequency is controlled to be a fixed value.

Alternatively, in the voltage controller for an automotive alternator, the conduction rate of the field coil is the conduction rate of a field coil driving transistor or an equivalent thereto, and is controlled to have an upper limit conduction rate and a lower limit conduction rate.

Alternatively, in the voltage controller for an automotive alternator, the conduction rate of the field coil is converted into a conduction rate signal of a predetermined frequency before it is output.

Preferably, in the voltage controller for an automotive alternator, the output of a conduction rate monitoring output terminal is controlled to have an upper limit conduction rate and a lower limit conduction rate.

Preferably, in the voltage controller for an automotive alternator, the switching means compares a battery voltage or a voltage equivalent thereto with a first set voltage thereby to control the supply and cutoff of exciting current supplied to a field coil, and the conduction rate monitoring output terminal outputs the conduction rate of the field coil if the battery voltage or the voltage equivalent thereto is not, less than a second set voltage, which is lower than the first set voltage, while it outputs a voltage change signal at a first set duty if the battery voltage or the voltage equivalent thereto is below the second set voltage.

Alternatively, in the controller of an automotive alternator, if the battery voltage or the voltage equivalent thereto drops below the second set voltage, then the conduction rate monitoring output terminal outputs a voltage change signal at the first set duty until the battery voltage or the voltage equivalent thereto exceeds a third set voltage, which is lower than the first set voltage but higher than the second set voltage.

Alternatively, in the voltage controller for an automotive alternator, if the battery voltage or the voltage equivalent thereto drops below the second set voltage, then the conduction rate monitoring output terminal outputs the voltage change signal at the first set duty for a predetermined period of time.

Alternatively, in the voltage controller for an automotive alternator, if the battery voltage or the voltage equivalent thereto drops below the second set voltage, then the conduction rate monitoring output terminal reduces an upper limit voltage of the voltage change signal.

Preferably, in the voltage controller for an automotive alternator, the first set duty is 100%.

Preferably, in the voltage controller for an automotive alternator, the switching means compares a battery voltage or a voltage equivalent thereto with the first set voltage thereby to control the supply and cutoff of exciting current supplied to the field coil, and the conduction rate monitoring output terminal outputs the conduction rate of the field coil if the battery voltage or the voltage equivalent thereto is below a fourth set voltage, which is higher than the first set voltage, while it outputs the voltage change signal at a second set duty if the battery voltage or the voltage equivalent thereto is the fourth set voltage or higher.

Preferably, in the voltage controller for an automotive alternator, if the battery voltage or the voltage equivalent thereto exceeds the fourth set voltage, then the conduction rate monitoring output terminal outputs the voltage change signal at the second set duty until the battery voltage or the voltage equivalent thereto drops down below a fifth set voltage, which is higher than the first set voltage but lower than the: fourth set voltage.

Alternatively, in the voltage controller for an automotive alternator, if the battery voltage or the voltage equivalent thereto exceeds the fourth set voltage, then the conduction rate monitoring output terminal outputs the voltage change: signal at the second set duty for a predetermined period of time.

Preferably, in the voltage controller for an automotive alternator, the second set duty is 0%.

Preferably, in the voltage controller for an automotive alternator, the conduction rate monitoring output terminal reverses an output signal and issues the reversed output signal.

BRIEF DESCRIPTION OF THE DRAWINGS

FIG. 11 is a circuit diagram of a conventional voltage controller for an automotive alternator.

DESCRIPTION OF THE PREFERRED EMBODIMENTS

First Embodiment

Figure 1:
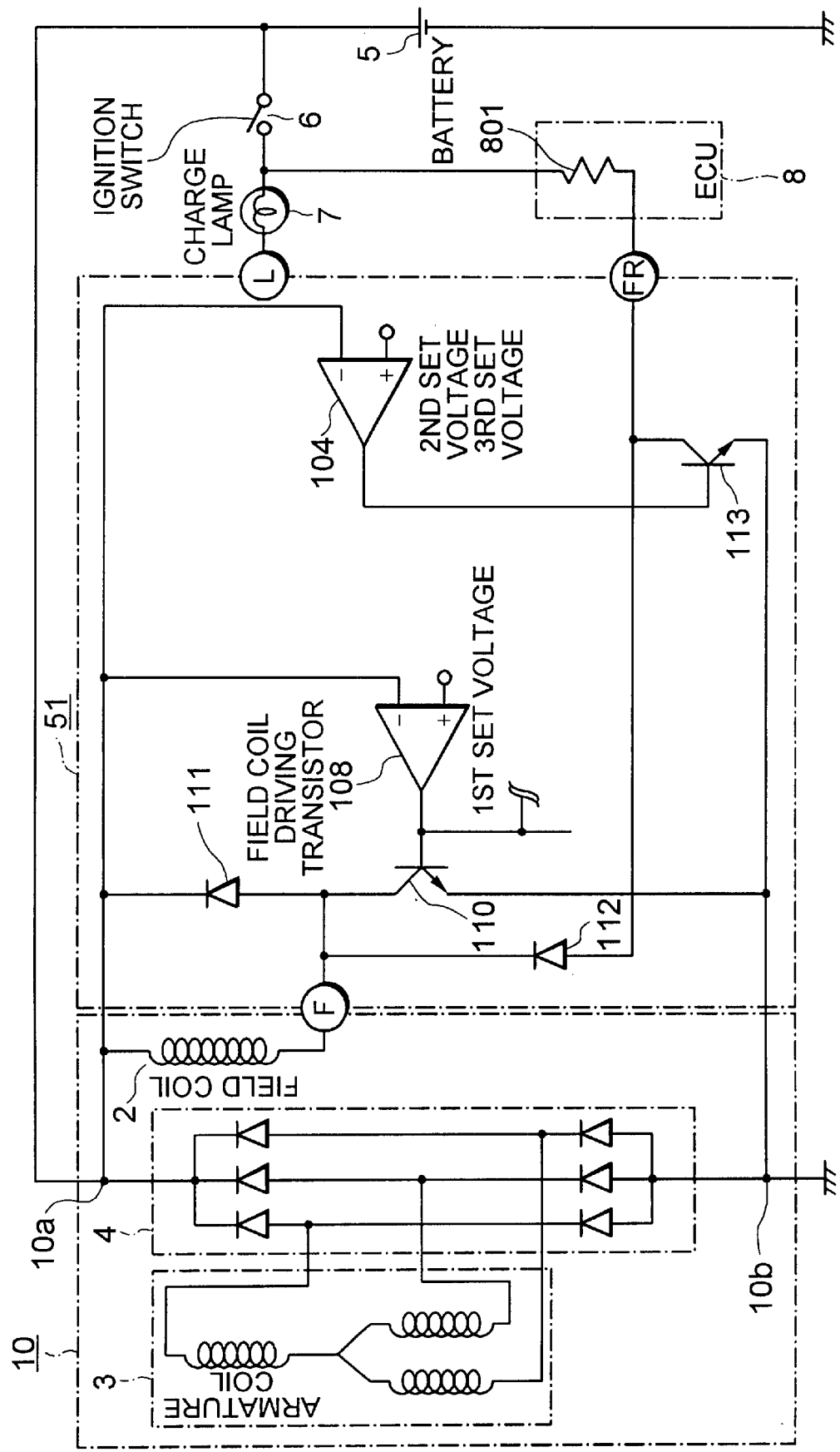
FIG. 1 is a circuit diagram of a first embodiment of a voltage controller for an automotive alternator in accordance with the present invention.

FIG. 1 is a circuit diagram of a first embodiment of a voltage controller for an automotive alternator in accordance with the present invention. Referring to FIG. 1, an automotive alternator 10 has a field coil 2, a Y-connected armature coil 3, and a rectifier 4. A main output terminal 10a of the alternator 10 is connected to the positive electrode of a battery 5, the negative electrode of the battery 5 being grounded.

A voltage controller 51 in accordance with the present invention is connected between the main output terminal 10a and a grounding terminal 10b of the alternator 10. The voltage controller 51 has an input terminal L to which the voltage of the battery 5 is applied via an ignition switch 6 and a charge lamp 7, which are interconnected in series. The voltage controller 51 also has a conduction rate monitoring output terminal (an FR terminal) for monitoring the conduction rate of the field coil 2 of the alternator 10 from the ignition switch 6 via an external control unit 8.

When the ignition switch 6 is closed, the voltage from the battery 5 is applied to the L terminal via the charge lamp 7, and the voltage is applied to the FR terminal via a resistor 801 of the external control unit 8.

A comparator 108 serving as a switching means indicates a High state when a rectified output voltage from the rectifier 4, which is an AC output generated at the armature coil 3, is below a first set voltage, e.g., 14.5 V, and turns ON a field coil driving transistor 110 to thereby supply field current to the field coil 2. At this time, the current passes via the diode 112, and the FR terminal indicates a Low state.

If the output voltage of the alternator is below a second set voltage, e.g., 13.5 V, which is lower than the first set voltage, then a comparator 104 indicates the High state and turns a transistor 113 ON, while the FR terminal indicates the Low state.

When the alternator 10 begins power generation and the output voltage of the alternator exceeds the first set voltage, the output of the comparator 108 indicates the Low state. This causes the field coil driving transistor 110 to be turned OFF, and the field current attenuates while circulating the field coil 2 and a diode 111. At this time, the FR terminal indicates the High state.

The voltage controller 51 having the configuration described above includes the comparator 108 serving as the switching means, which is connected to the alternator 10 driven by an engine to charge the battery, and controls the supply and cutoff of the exciting current supplied to the field coil 2 of the alternator 10, and the conduction rate monitoring output terminal (FR terminal) for monitoring the conduction rate of the field coil 2. The conduction rate monitoring output terminal outputs the conduction rate of the field coil 2 in a steady mode wherein the output voltage of the alternator 10 is a predetermined voltage, namely, the second set voltage (13.5 V) or more, while it outputs a voltage change signal of the alternator 10 in a transient mode wherein the output voltage of the alternator 10 is below a predetermined voltage, namely, the second predetermined:, voltage (13.5 V). With this arrangement, the voltage controller 51 is able to issue the voltage change signal indicating a voltage drop in the alternator during the transient mode, typically represented by the case where a load of the alternator 10 is turned ON, in addition to monitoring the conduction rate of the field coil 2. This feature prevents a delay in response to the external control unit 8, which is an engine controller, thus enabling proper engine control to be performed.

Figure 2:
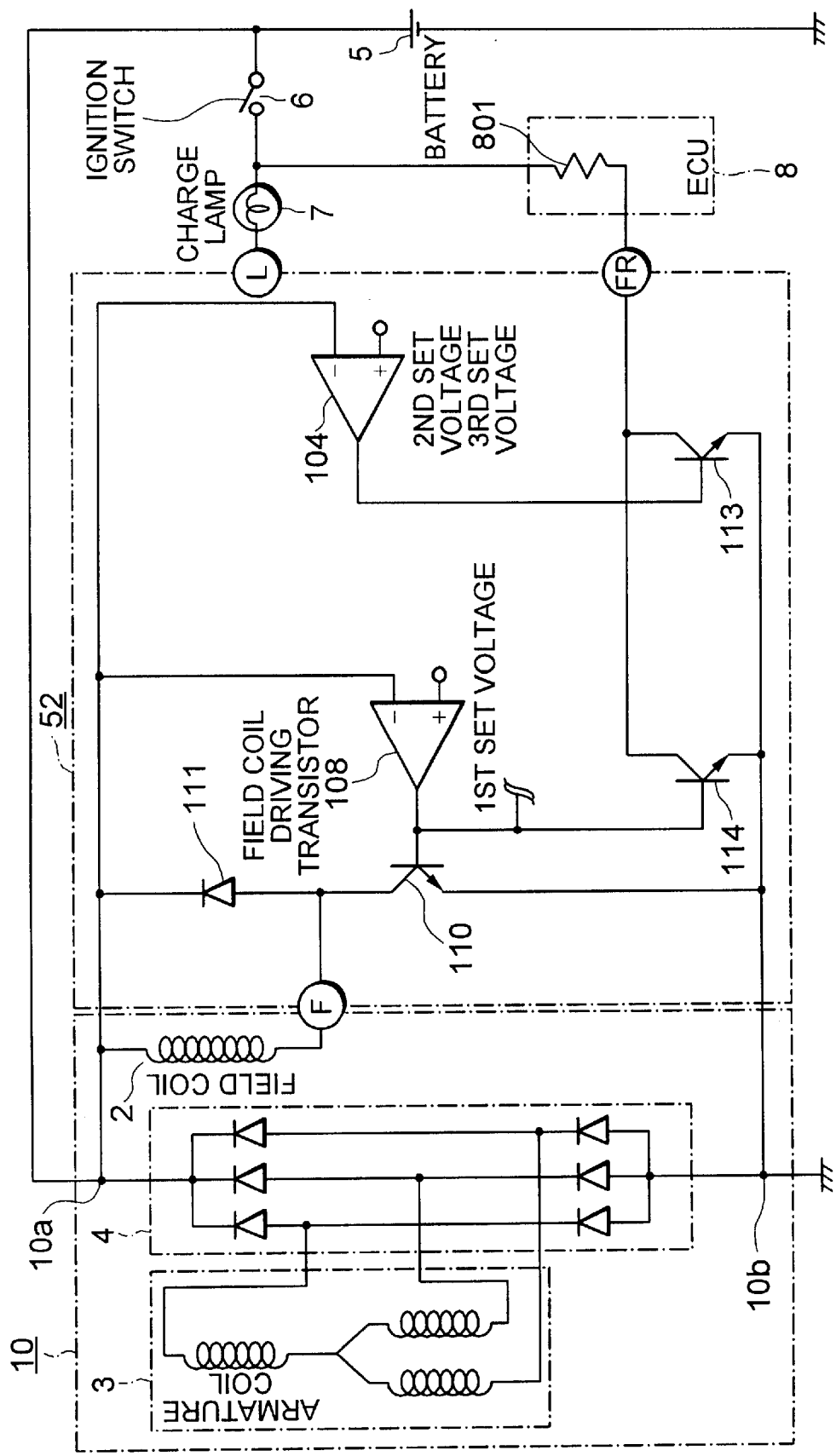
FIG. 2 is a circuit diagram of a second embodiment of the voltage controller for an automotive alternator in accordance with the present invention.

The signals issued from the conduction rate monitoring output terminal (FR terminal) may be reversed, as necessary, by providing, for example, an inverter or the like (not shown). This arrangement permits handling of both in-phase and reverse modes, leading to higher flexibility Second Embodiment FIG. 2 is a circuit diagram of a second embodiment of the voltage controller for an automotive alternator in accordance with the present invention. Referring specifically to FIG. 2, a transistor 114 is provided between an FR terminal of a voltage controller 52 according to this embodiment and the ground. The output of a comparator 108 is connected to the base of the transistor 114. The second embodiment does not have the diode 112 in the first embodiment. On the other hand, the second embodiment has a comparator 104 and a transistor 113, as in the case of the first embodiment.

In this embodiment, if the rectified output voltage, which is based on the AC output generated at an armature coil 3 and has been rectified by a rectifier 4, is below a first set voltage, e.g., 14.5 V, then the comparator 108 indicates the High state and turns ON a field coil driving transistor 110 so as to pass field current to a field coil 2. At this time, the comparator 108 turns ON the transistor 114, and the FR terminal indicates the Low state.

The voltage controller 52 having the construction described above provides the same advantages as those provided by the first embodiment.

Third Embodiment

Figure 3:
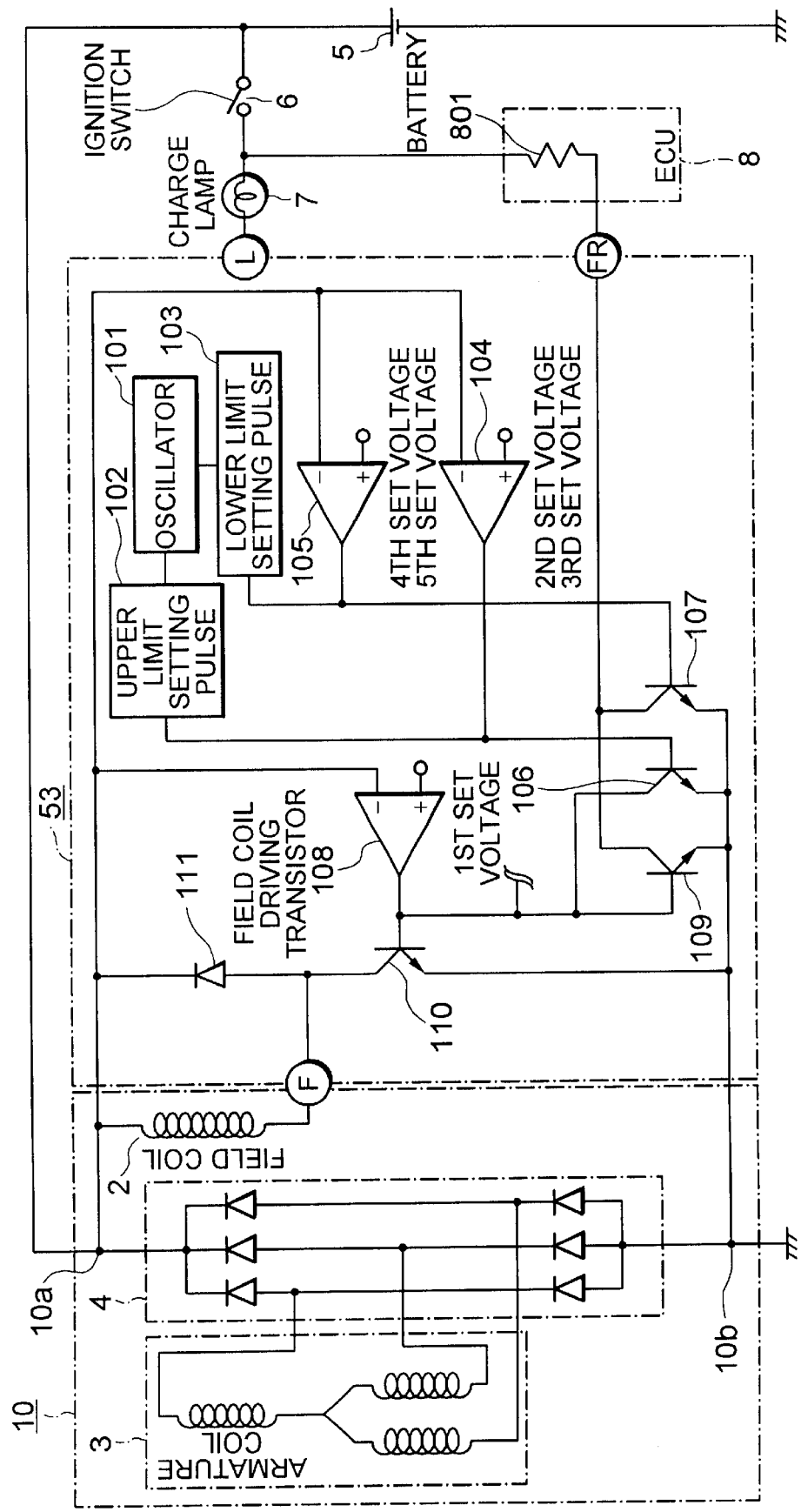
FIG. 3 is a circuit diagram of a third embodiment of the voltage controller for an automotive alternator in accordance with the present invention.

FIG. 3 is a circuit diagram of a third embodiment of the voltage controller for an automotive alternator in accordance with the present invention. Referring to FIG. 3, if the rectified output voltage, which is based on the AC output generated at an armature coil 3 and has been rectified by a rectifier 4, is below a first set voltage, e.g., 14.5 V, then a comparator 108 of a voltage controller 53 according to the third embodiment indicates the High state, and turns ON a field coil driving transistor 110 so as to pass field current to a field coil 2.

At this time, a transistor 109 connected to an FR terminal is turned ON, and the FR terminal indicates the Low state. The transistor 109 is turned OFF only when a transistor 106 is turned ON by an upper limit setting pulse 102 generated by an oscillator 101, and the FR terminal indicates the High state. The upper limit setting pulse 102 is a pulse of a first set duty in the vicinity of 100%, e.g., 98%.

The upper limit setting pulse 102 is cleared when the output of a comparator 104 is switched to Low, and the transistor 106 is turned OFF. The comparator 104 is configured such that, if the output voltage of the alternator is below a second set voltage, e.g., 13.5 V, which is lower than a first set voltage, then the comparator 104 indicates the Low state, and changes the second set voltage to a third set voltage, e.g., 14 V, which is higher than the second set voltage. In other words, the comparator 104 has hysteresis.

When the alternator begins power generation, and the output voltage of the alternator exceeds the first set voltage, the output of the comparator 108 indicates the Low state. This causes a field coil driving transistor 110 to be turned OFF, and the field current attenuates while circulating a field coil 2 and a diode 111. At this time, the transistor 109 connected to the FR terminal turns OFF, and the FR terminal indicates the High state. The FR terminal indicates the Low state only when the transistor 107 is turned ON by a lower limit setting pulse 103 generated by the oscillator 101. The lower limit setting pulse 103 is a pulse of a second set duty in the vicinity of 0%, e.g., 2%.

The lower limit setting pulse 103 is cleared when the output of a comparator 105 is switched to Low, and the transistor 107 is turned OFF. The comparator 105 is configured such that, if the output voltage of the alternator exceeds a fourth set voltage, e.g., 15.5 V, which is higher than the first set voltage, then the comparator 105 indicates the Low state, and changes the fourth set voltage to a fifth set voltage, e.g., 15 V, which is lower than the fourth set voltage. In other words, the comparator 105 has hysteresis.

Figure 4:
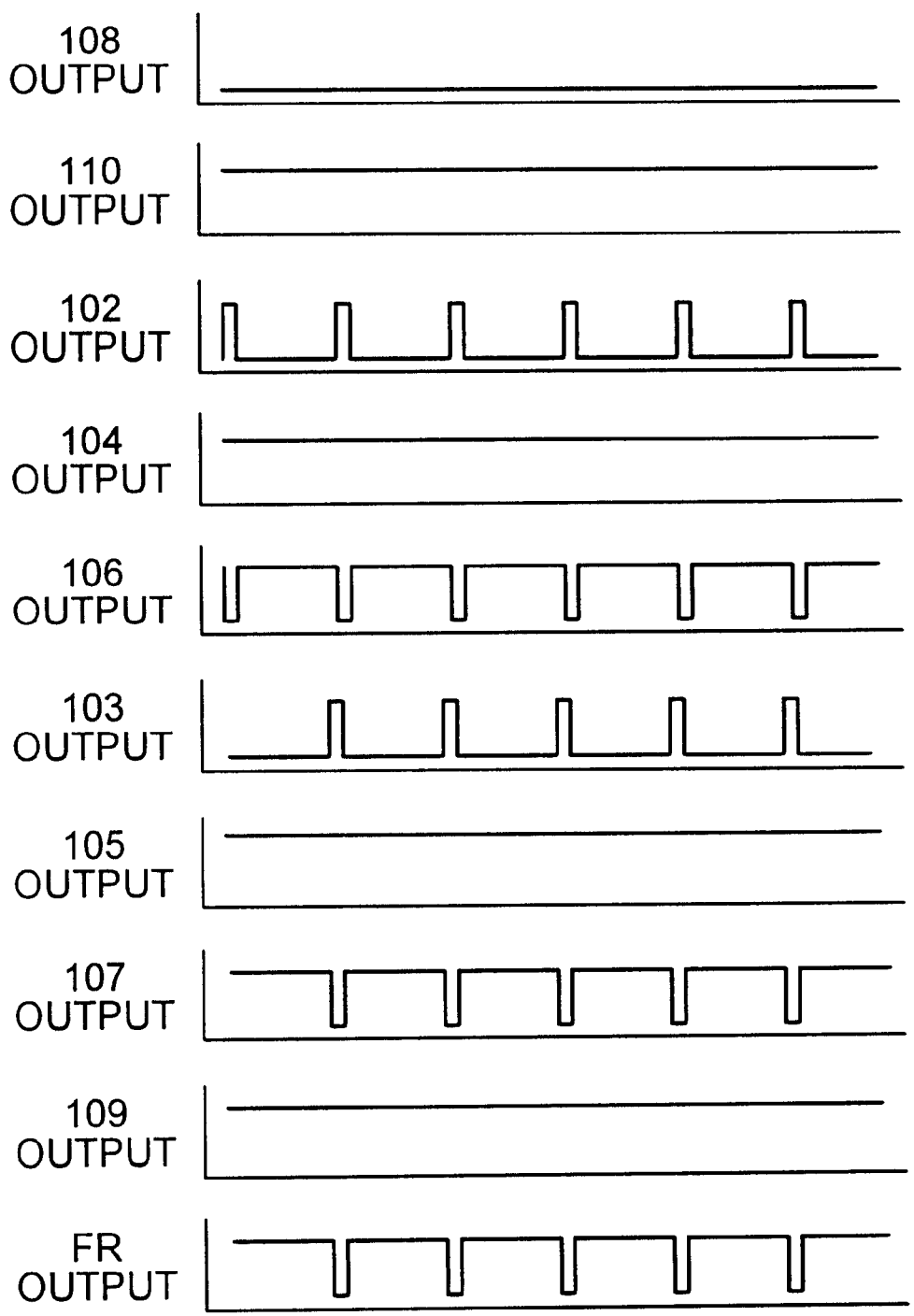
FIG. 4 is a timing chart showing the High/Low state of the output of each element if the output voltage of the alternator according to the third embodiment is represented by "4th set voltage>Output voltage of the alternator> 1st set voltage"

FIG. 4 is a timing chart showing the High/Low state of the output of each element of a voltage controller 53 according to this embodiment, specifically if the output voltage of the alternator 10 according to the third embodiment is represented by "4th set voltage >Output voltage of the alternator 10 >1st set voltage."In the timing chart, the numerals at left denote the elements shown in FIG. 3.

Figure 5:
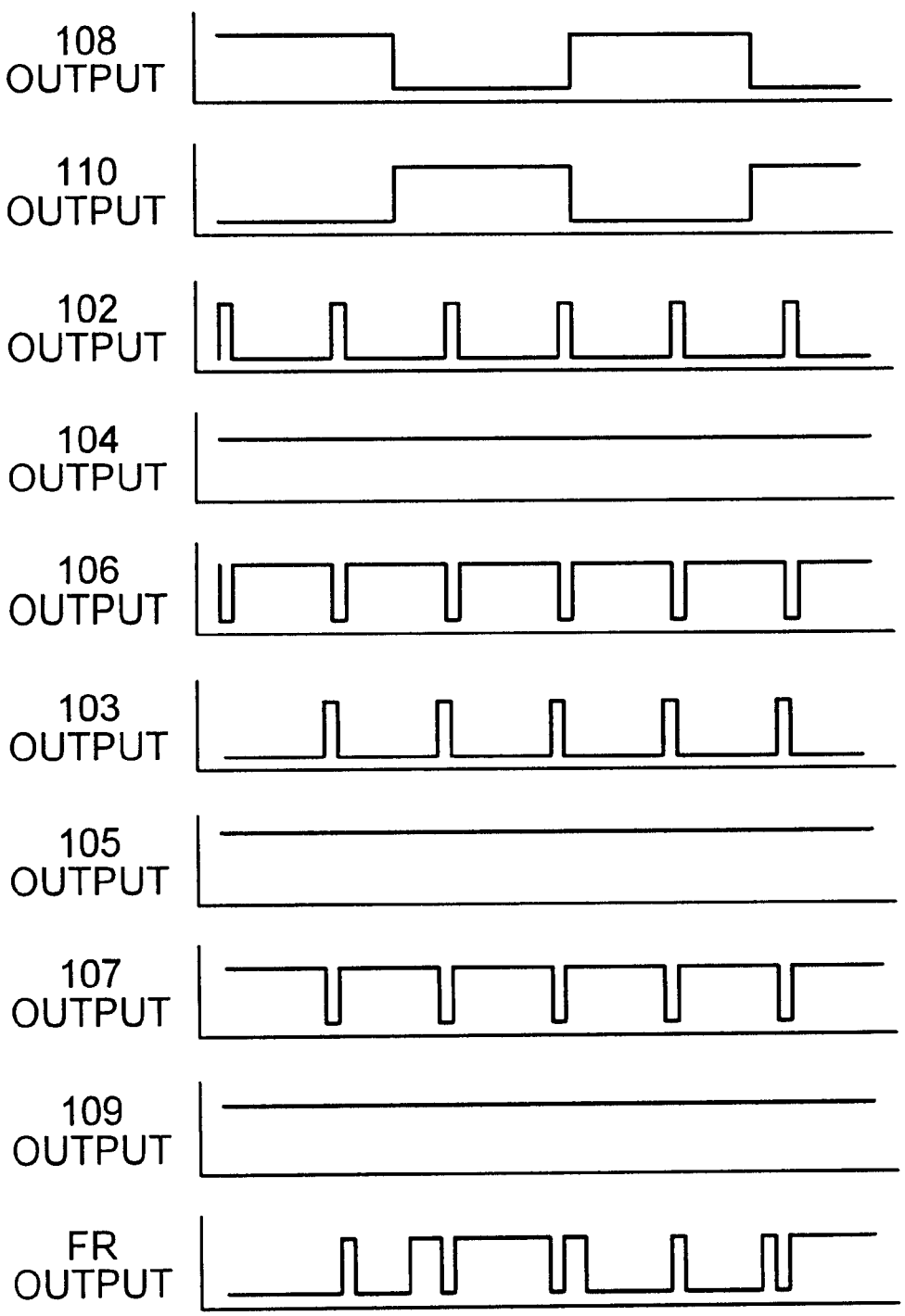
FIG. 5 is a timing chart showing the High/Low state of the output of each element if the output voltage of the alternator according to the third embodiment is represented by "4th set voltage>Output voltage of the alternator>2nd set voltage"

FIG. 5 is a timing chart applicable if the output voltage of the alternator 10 is represented by "4th set voltage>Output voltage of the alternator 10>2nd set voltage."

Figure 6:
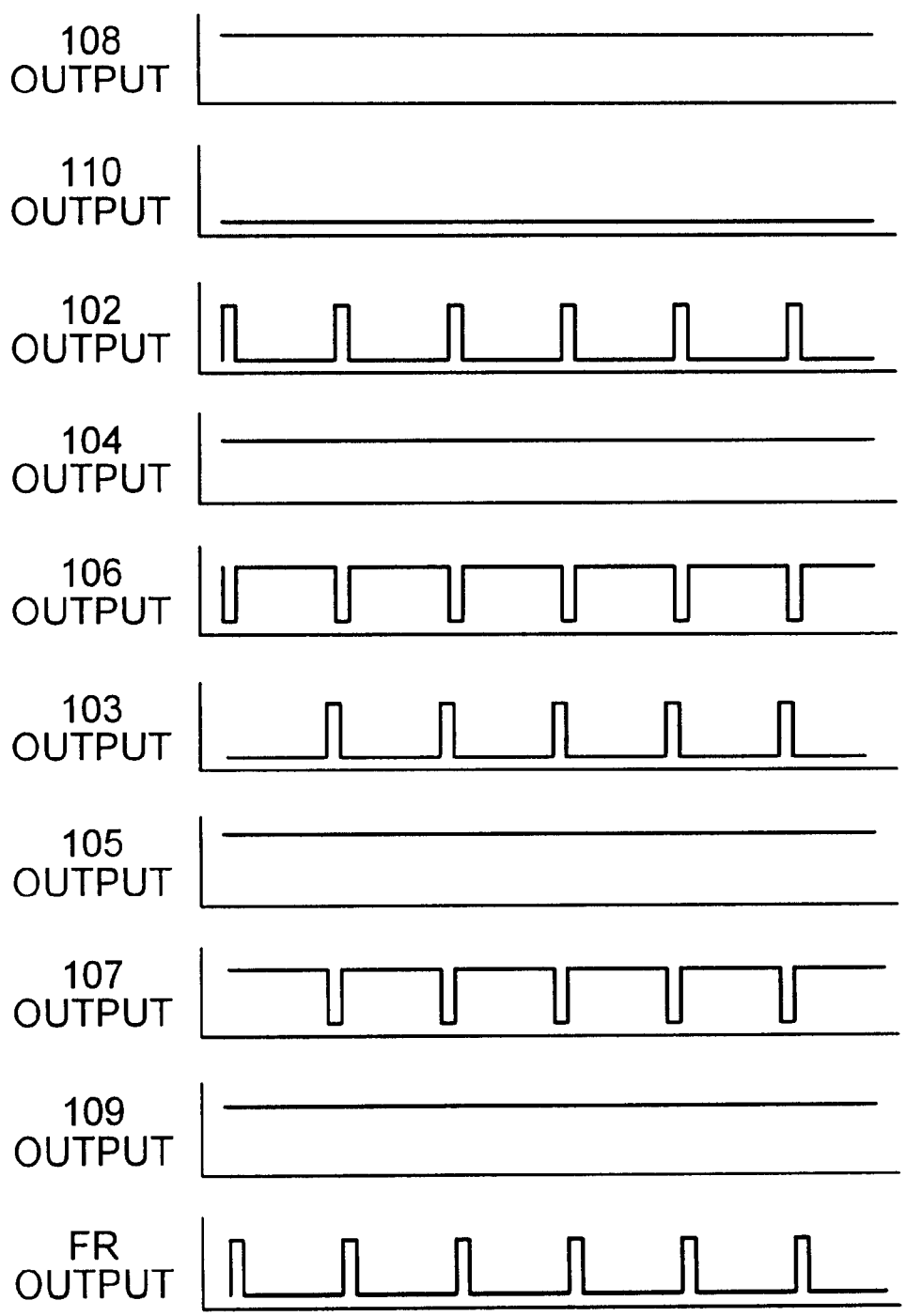
FIG. 6 is a timing chart showing the High/Low state of the output of each element if the output voltage of the alternator according to the third embodiment is represented by "2nd set voltage<Output voltage of the alternator<1st set voltage"

FIG. 6 is a timing chart applicable if the output voltage of the alternator 10 is represented by "2nd set voltage<Output voltage of the alternator 10<1st set voltage."

Figure 7:
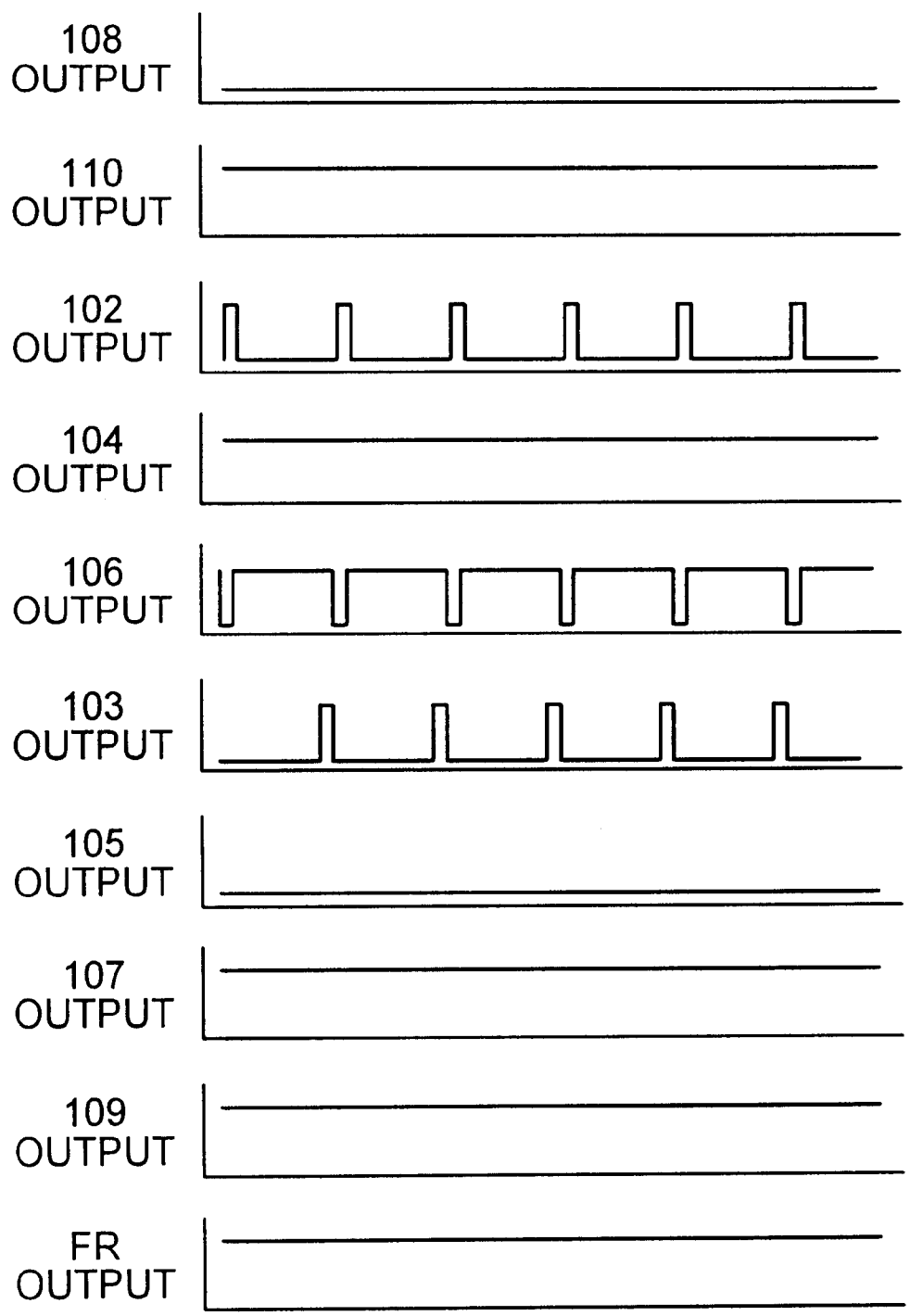
FIG. 7 is a timing chart showing the High/Low state of the output of each element if the output voltage of the alternator according to the third embodiment is represented by "Output voltage of the alternator>4th set voltage or 5th set voltage (>1st set voltage)"

FIG. 7 is a timing chart applicable if the output voltage of the alternator 10 is represented by "Output voltage of the alternator 10>4th set voltage or 5th set voltage (>1st set voltage)."

Figure 8:
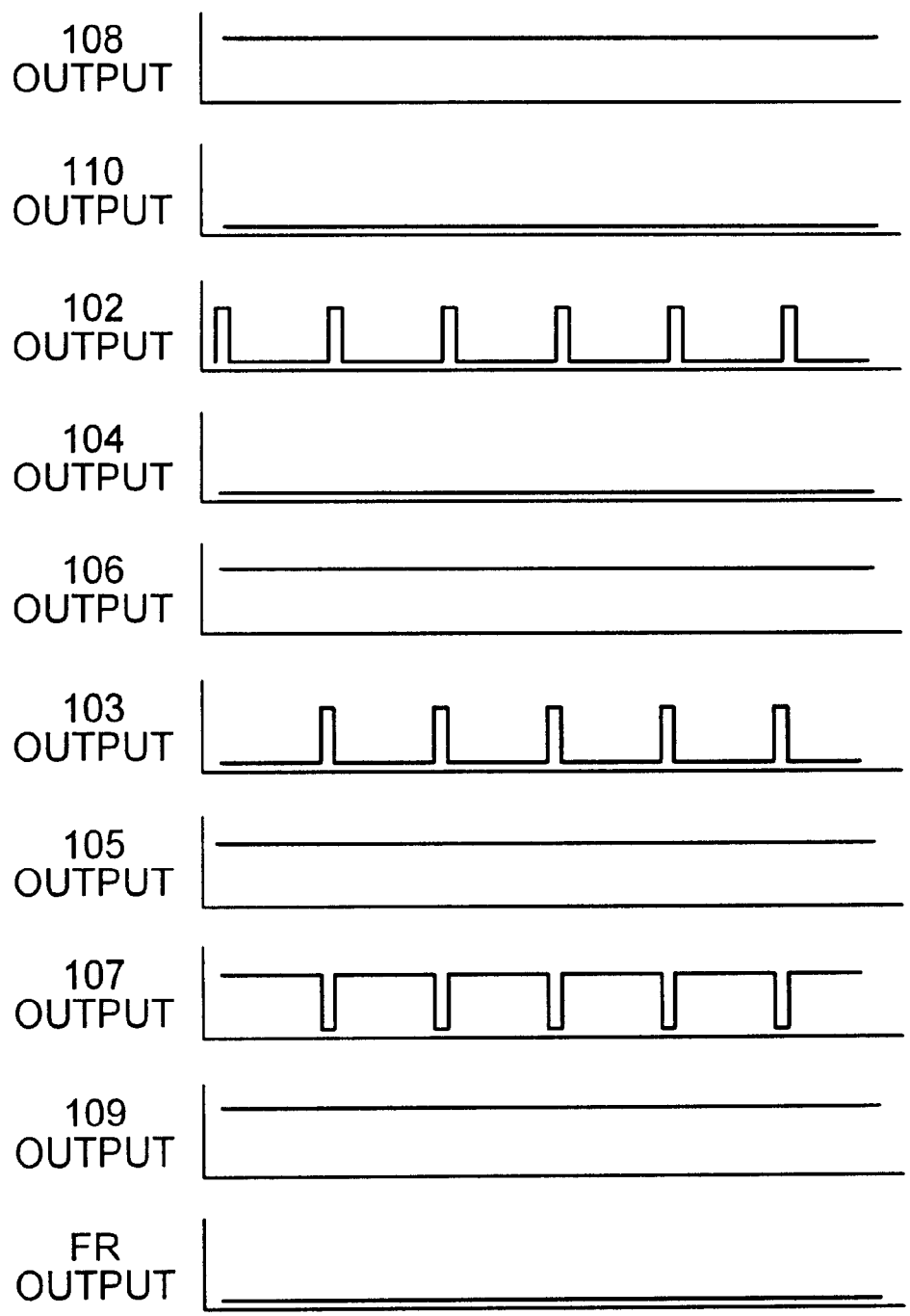
FIG. 8 is a timing chart showing the High/Low state of the output of each element if the output voltage of the alternator according to the third embodiment is represented by "Output voltage of the alternator<2nd set voltage or 3rd set voltage (<1st set voltage)"

FIG. 8 is a timing chart applicable if the output voltage of the alternator 10 is represented by "Output voltage of the alternator 10<2nd set voltage or 3rd set voltage (<1st set voltage)."

In the voltage controller 53 configured as described above, the conduction rate of the field coil output from the FR terminal is controlled so as to maintain the frequency at a constant level by the oscillator 101. This feature permits easy signal processing to be accomplished by an external control unit 8, which is an engine controller.

Furthermore, the conduction rate of the field coil is controlled by the upper limit setting pulse 102 and a lower limit setting pulse 103 so as to have an upper limit conduction rate and a lower limit conduction rate. This feature permits easy signal processing to be accomplished by the external control unit 8, which is an engine controller.

In the voltage controller 53 having the construction described above, the comparator 108 serving as a switching means compares the voltage of a battery 5 with the first set voltage (14.5 V) thereby to control the supply and cutoff of the exciting current supplied to the field coil 2. A conduction rate monitoring output terminal or the FR terminal outputs the conduction rate of the field coil 2 if the voltage of the battery 5 is not less than the second set voltage (13.5 V), which is lower than the first set voltage, while it outputs a voltage change signal at the first set duty if the voltage of the battery 5 is below the second set voltage (13.5 V). With this arrangement, the conduction rate monitoring output terminal or the FR terminal is able to issue the voltage change signal indicating a voltage drop in the alternator 10 during a transient mode, typically represented by the case where a load of the alternator 10 is turned ON, in addition to monitoring the conduction rate of the field coil 2. This feature prevents a delay in response to the external control unit 8, which is an engine controller, thus enabling proper engine control to be performed.

Furthermore, in the voltage controller 53, if the voltage of the battery 5 drops below the second set voltage (13.5 V), then the conduction rate monitoring output terminal or the FR terminal outputs a voltage change signal at the first set duty until the voltage of the battery 5 exceeds a third set voltage (14 V), which is lower than the first set voltage but higher than the second set voltage. Thus, providing the hysteresis makes it possible to stably output a transient voltage drop signal.

In the voltage controller 53 having the construction described above, the conduction rate monitoring output terminal or the FR terminal outputs the conduction rate of the field coil 2 if the voltage of the battery 5 is below a fourth set voltage (15.5 V), which is higher than the first set voltage, while it outputs a voltage change signal at the second set duty if the voltage of the battery 5 is the fourth set voltage (15.5 V) or more. With this arrangement, the conduction rate monitoring output terminal or the FR terminal is able to issue the voltage change signal indicating a voltage increase in the alternator 10 during a transient mode, in addition to monitoring the conduction rate of the field coil 2. This feature prevents a delay in response to the external control unit 8, which is an engine controller, thus enabling proper engine control to be performed.

Furthermore, in the voltage controller 53, if the voltage of the battery 5 exceeds the fourth set voltage (15.5 V), then the conduction rate monitoring output terminal or the FR terminal outputs a voltage change signal at the second,set duty until the voltage of the battery 5 drops below a fifth set voltage (15 V), which is higher than the first set voltage but lower than the fourth set voltage. Thus, providing the hysteresis makes it possible to stably output a transient voltage increase signal.

The comparator 104 and the comparator 105 in this embodiment are provided with the third set voltage and the fifth set voltage, respectively, to provide the hysteresis so as to output stable output signals. Alternatively, however, a timer, for example, may be provided to replace the hysteresis, and the output signal may be fixed at the first set duty or the second set duty for a predetermined time from the moment the voltage of the battery 5 drops below the second set voltage or exceeds the fourth set voltage, thereby ensuring stable output signals.

The upper limit setting pulse 102 and the lower limit setting pulse 103 are a 98%-duty pulse and a 2%-duty pulse, respectively. The duties, however, are not limited to 98% and 2%; a predetermined advantage can be obtained if the duties are close to 100% and 0%, respectively. Further alternatively, the duties of the upper limit setting pulse 102 and the lower limit setting pulse 103 may be set exactly to 100% and 0%, respectively. Setting the upper limit and the lower limit of the output signal to such duties permits easy signal processing at the external control unit 8, which is the engine controller.

Fourth Embodiment

Figure 9:
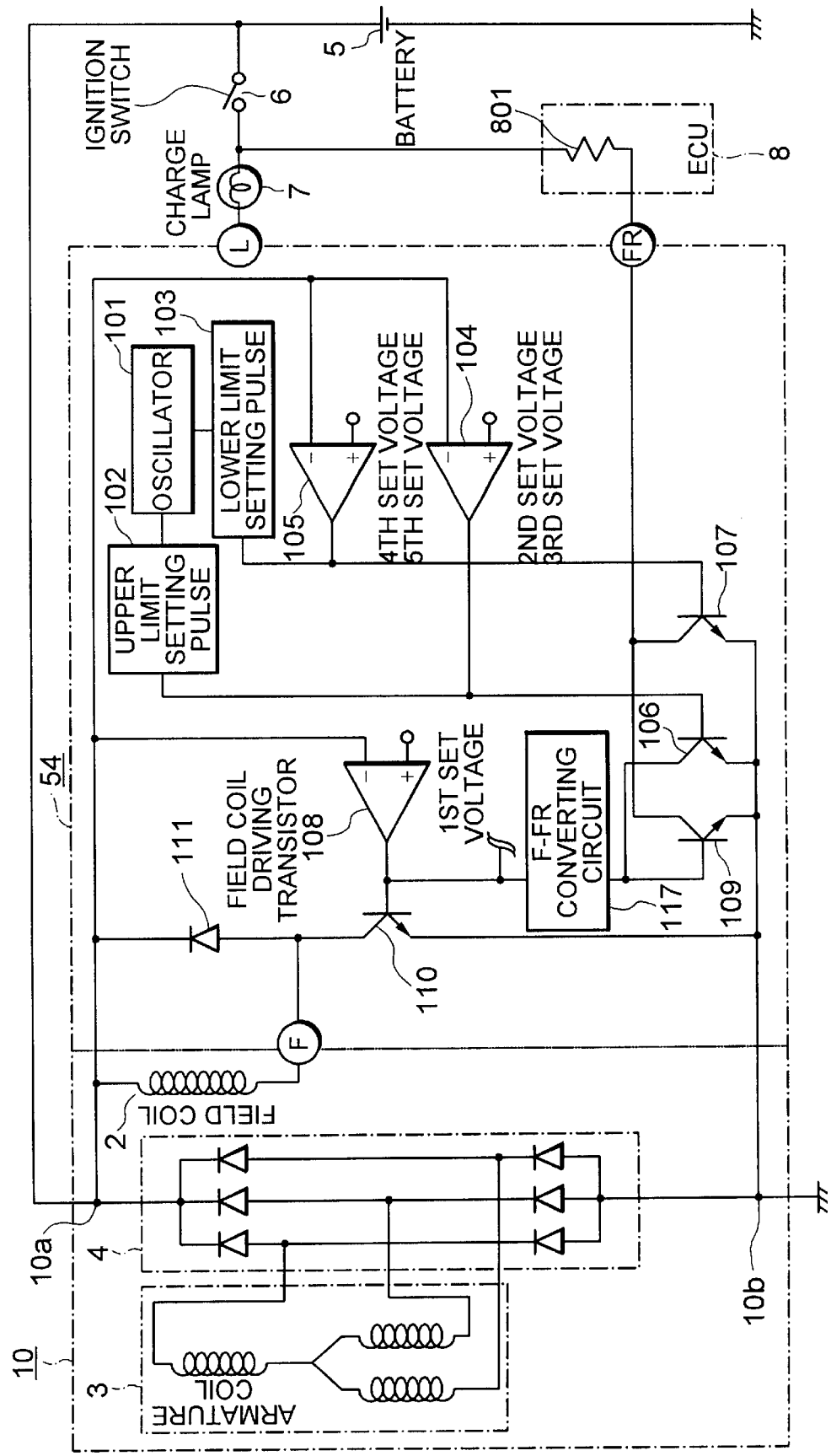
FIG. 9 is a circuit diagram of a fourth embodiment of the voltage controller for an automotive alternator in accordance with the present invention.

FIG. 9 is a circuit diagram of a fourth embodiment of the voltage controller for an automotive alternator in accordance with the present invention. Referring specifically to FIG. 9, a voltage controller 54 according to a fourth embodiment includes an F-FR converting circuit 117 provided between a comparator 108 and an FR terminal. The F-FR converting circuit 117 converts output signals into conduction rate signals of a fixed frequency. The rest of the configuration of the fourth embodiment is the same as the configuration of the third embodiment.

In the voltage controller 54 having the aforesaid configuration, the conduction rate of a field coil 2 that is output from the FR terminal is converted into a conduction rate signal of a fixed frequency before it is output. Therefore, the conduction rate can be output after having been converted into the conduction rate signal of a fixed frequency, without being affected by the control of the field coil 2. This arrangement permits easy signal processing at an external control unit 8, which is an engine controller.

Fifth Embodiment

Figure 10:
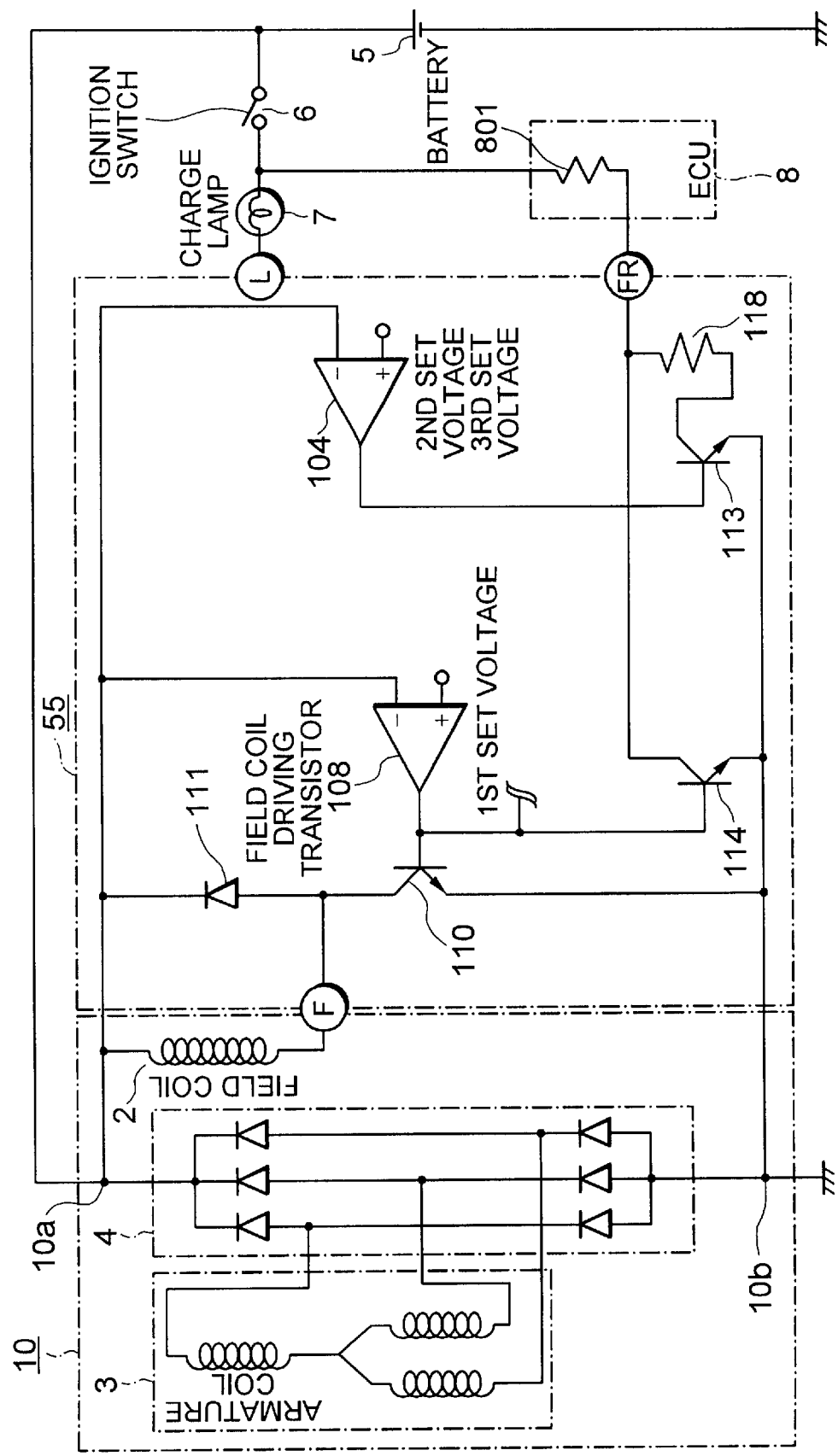
FIG. 10 is a circuit diagram of a fifth embodiment of the voltage controller for an automotive alternator in accordance with the present invention.

FIG. 10 is a circuit diagram of a fifth embodiment of the voltage controller for an automotive alternator in accordance with the present invention. In a voltage controller 55 according to this embodiment shown in FIG. 10, if the output voltage of an alternator is below a second set voltage, e.g., 13.5 V, which is lower than a first set voltage, then a comparator 104 indicates the High state and turns a transistor 113 ON, while an FR terminal indicates the Low state, as in the case of the second embodiment.

Further, in this embodiment, a resistor 118 is provided between the transistor 113 and the FR terminal. Hence, a differential voltage produced from the resistor 118 and a resistor 801 of an external control unit 8 causes a predetermined drop in the upper limit voltage of a voltage change signal output from the FR terminal. The rest of the construction is the same as the construction of the second embodiment.

In the voltage controller 55 constructed as set forth above, if the voltage of a battery 5 drops below the second set voltage (13.5 V), then a conduction rate monitoring output terminal or the FR terminal lowers the upper limit voltage of the voltage change signal. Thus, the height of the rectangular waveform of the voltage change signal is reduced, enabling the rectangular waveform of the voltage change signal to be distinguished from the rectangular waveform indicating the conduction rate of the field coil. This feature adds to the amount of information, leading to expanded controllability.

The voltage controller for an automotive alternator in accordance with the present invention includes a switching means connected to an alternator, which is driven by an engine to charge a battery, to control supply and cutoff of exciting current supplied to a field coil of the alternator, and a conduction rate monitoring output terminal for monitoring the conduction rate of the field coil, wherein the conduction rate monitoring output terminal outputs the conduction rate of the field coil in a steady mode wherein the output voltage of the alternator is a predetermined voltage or more, while it outputs an alternator voltage change signal in a transient mode wherein the output voltage of the alternator is below the predetermined voltage. Hence, the voltage change signal indicating a voltage drop in the alternator during a transient mode of the alternator, typically represented by the case where a load of the alternator is turned ON, can be issued in addition to monitoring the conduction rate of the field coil. This arrangement makes it possible to prevent a delay in response to an engine controller, allowing proper engine control to be carried out.

In the voltage controller for an automotive alternator according to the present invention, the conduction rate of the field coil is the conduction rate of a field coil driving transistor or an equivalent thereto, and frequency is controlled to be a fixed value. This arrangement permits easy signal processing at the engine controller.

In the voltage controller for an automotive alternator according to the present invention, the conduction rate of the field coil is the conduction rate of a field coil driving transistor or an equivalent thereto, and is controlled to have an upper limit conduction rate and a lower limit conduction rate. This arrangement permits easy signal processing at the engine controller.

In the voltage controller for an automotive alternator according to the present invention, the conduction rate of the field coil is converted into a conduction rate signal of a predetermined frequency before it is output. Hence, the conduction rate of the field coil is output after having been converted into a conduction rate signal of a fixed frequency, without being affected by the control of the field coil. This arrangement permits easy signal processing at the engine controller.

In the voltage controller for an automotive alternator according to the present invention, the output of a conduction rate monitoring output terminal is controlled to have an upper limit conduction rate and a lower limit conduction rate. This arrangement permits easy signal processing at the engine controller, without being affected by the control of the field coil.

In the voltage controller for an automotive alternator according to the present invention, the switching means compares a battery voltage or a voltage equivalent thereto with a first set voltage thereby to control the supply and cutoff of exciting current supplied to a field coil, and the conduction rate monitoring output terminal outputs the conduction rate of the field coil if the battery voltage or the voltage equivalent thereto is not less than a second set voltage, which is lower than the first set voltage, while it outputs a voltage change signal at a first set duty if the battery voltage or the voltage equivalent thereto is below the second set voltage. Hence, a voltage change signal indicating a voltage drop in the alternator during the transient mode of the alternator typically represented by the case where a load is turned ON can be issued in addition to monitoring the conduction rate of the field coil. This feature prevents a delay in response to an engine controller, thus enabling proper engine control to be performed.

In the controller of an automotive alternator according to the present invention, if the battery voltage or the voltage equivalent thereto drops below the second set voltage, then the conduction rate monitoring output terminal outputs a voltage change signal at the first set duty until the battery voltage or the voltage equivalent thereto exceeds a third set voltage, which is lower than the first set voltage but higher than the second set voltage. Provision of such hysteresis allows a transient voltage drop signal to be stably output.

In the voltage controller for an automotive alternator according to the present invention, if the battery voltage or the voltage equivalent thereto drops below the second set voltage, then the conduction rate monitoring output terminal outputs the voltage change signal at the first set duty for a predetermined period of time. By fixing the voltage change signal at the first set duty for the predetermined period of time, the output signals can be stably issued.

In the voltage controller for an automotive alternator according to the present invention, if the battery voltage or the voltage equivalent thereto drops below the second set voltage, then the conduction rate monitoring output terminal reduces an upper limit voltage of the voltage change signal. This causes the height of the rectangular waveform of the voltage change signal to be reduced so as to allow the rectangular waveform of the voltage change signal to be distinguished from the rectangular waveform indicating the conduction rate of the field coil. This feature adds to the amount of information, leading to expanded controllability.

In the voltage controller for an automotive alternator according to the present invention, the first set duty is 100%. This permits easy signal processing at the engine controller In the voltage controller for an automotive alternator according to the present invention, the switching means compares a battery voltage or a voltage equivalent thereto with the first set voltage thereby to control the supply and cutoff of exciting current supplied to the field coil, and the conduction rate monitoring output terminal outputs the conduction rate of the field coil if the battery voltage or the voltage equivalent thereto is below a fourth set voltage, which is higher than the first set voltage, while it outputs the voltage change signal at a second set duty if the battery voltage or the voltage equivalent thereto is the fourth set voltage or higher. Hence, a voltage change signal indicating a voltage increase in the alternator during the transient mode of the alternator can be issued in addition to monitoring the conduction rate of the field coil. This feature prevents a delay in response to an engine controller, thus enabling proper engine control to be performed.

In the voltage controller for an automotive alternator according to the present invention, if the battery voltage or the voltage equivalent thereto exceeds the fourth set voltage, then the conduction rate monitoring output terminal outputs the voltage change signal at the second set duty until the battery voltage or the voltage equivalent thereto drops down below a fifth set voltage, which is higher than the first set voltage but lower than the fourth set voltage. Provision of such hysteresis allows a transient voltage increase signal to be stably output.

In the voltage controller for an automotive alternator according to the present invention, if the battery voltage or the voltage equivalent thereto exceeds the fourth set voltage, then the conduction rate monitoring output terminal outputs the voltage change signal at the second set duty for a predetermined period of time. Hence, by fixing the voltage change signal at the second set duty for the predetermined period of time, the output signals can be stably issued.

In the voltage controller for an automotive alternator according to the present invention, the second set duty is 0%. This permits easy signal processing at the engine controller.

In the voltage controller for an automotive alternator according to the present invention, the conduction rate monitoring output terminal reverses an output signal and issues the reversed output signal. This arrangement permits both in-phase and reverse modes to be handled, leading to higher flexibility.

What is claimed is:

1. A voltage controller for an automotive alternator, comprising:

a switching means connected to an alternator, which is driven by an engine to charge a battery, so as to control supply and cutoff of exciting current supplied to a field coil of the alternator; and a conduction rate monitoring output terminal for monitoring the conduction rate of the field coil, wherein the conduction rate monitoring output terminal outputs the conduction rate of the field coil in a steady mode wherein the output voltage of the alternator is a predetermined voltage or more, while it outputs an alternator voltage change signal in a transient mode wherein the output voltage of the alternator is below the predetermined voltage.

2. A voltage controller for an automotive alternator according to claim 1, wherein the conduction rate of the field coil is the conduction rate of a field coil driving transistor or an equivalent thereto, and frequency is controlled to be constant.

3. A voltage controller for an automotive alternator according to claim 1, wherein the conduction rate of the field coil is the conduction rate of the field coil driving transistor or an equivalent thereto, and is controlled to have an upper limit conduction rate and a lower limit conduction rate.

4. A voltage controller for an automotive alternator according to claim 1, wherein the conduction rate of the field coil is converted into a conduction rate signal of a predetermined frequency before it is output.

5. A voltage controller for an automotive alternator according to claim 1, wherein the output of a conduction rate monitoring output terminal is controlled to have an upper limit conduction rate and a lower limit conduction rate.

6. A voltage controller for an automotive alternator according to claim 1, wherein the switching means compares a battery voltage or a voltage equivalent thereto with a first set voltage thereby to control the supply and cutoff of exciting current supplied to the field coil, and the conduction rate monitoring output terminal outputs the conduction rate of the field coil if the battery voltage or the voltage equivalent thereto is not less than a second set voltage, which is lower than the first set voltage, while it outputs a voltage change signal at a first set duty if the battery voltage or the voltage equivalent thereto is below the second set voltage.

7. A voltage controller for an automotive alternator according to claim 6, wherein if the battery voltage or the voltage equivalent thereto drops below the second set voltage, then the conduction rate monitoring output terminal outputs a voltage change signal at the first set duty until the battery voltage or the voltage equivalent thereto exceeds a third set voltage, which is lower than the first set voltage but higher than the second set voltage.

8. A voltage controller for an automotive alternator according to claim 6, wherein if the battery voltage or the voltage equivalent thereto drops below the second set voltage, then the conduction rate monitoring output terminal outputs the voltage change signal at the first set duty for a predetermined period of time.

9. A voltage controller for an automotive alternator according to claim 6, wherein if the battery voltage or the voltage equivalent thereto drops below the second set voltage, then the conduction rate monitoring output terminal reduces an upper limit voltage of the voltage change signal.

10. A voltage controller for an automotive alternator according to claim 6, wherein the first set duty is 100%.

11. A voltage controller for an automotive alternator according to claim 1, wherein the switching means compares a battery voltage or a voltage equivalent thereto with the first set voltage thereby to control the supply and cutoff of exciting current supplied to the field coil, and the conduction rate monitoring output terminal outputs the conduction rate of the field coil if the battery voltage or the voltage equivalent thereto is below a fourth set voltage, which is higher than the first set voltage, while it outputs the voltage change signal at a second set duty if the battery voltage or the voltage equivalent thereto is the fourth set voltage or higher.

12. A voltage controller for an automotive alternator according to claim 11, wherein if the battery voltage or the voltage equivalent thereto exceeds the fourth set voltage, then the conduction rate monitoring output terminal outputs the voltage change signal at the second set duty until the battery voltage or the voltage equivalent thereto drops down below a fifth set voltage, which is higher than the first set voltage but lower than the fourth set voltage.

13. A voltage controller for an automotive alternator according to claim 11, wherein if the battery voltage or the voltage equivalent thereto exceeds the fourth set voltage, then the conduction rate monitoring output terminal outputs the voltage change signal at the second set duty for a predetermined period of time.

14. A voltage controller for an automotive alternator according to claim 11, wherein the second set duty is 0%.

15. A voltage controller for an automotive alternator according to claim 1, wherein the conduction rate monitoring output terminal reverses an output signal and issues the reversed output signal.

* * * * *